July 10, 1923.
F. STEBLER
BOX ELEVATOR FEEDER
Filed Oct. 31, 1921
1,461,465
2 Sheets-Sheet 2
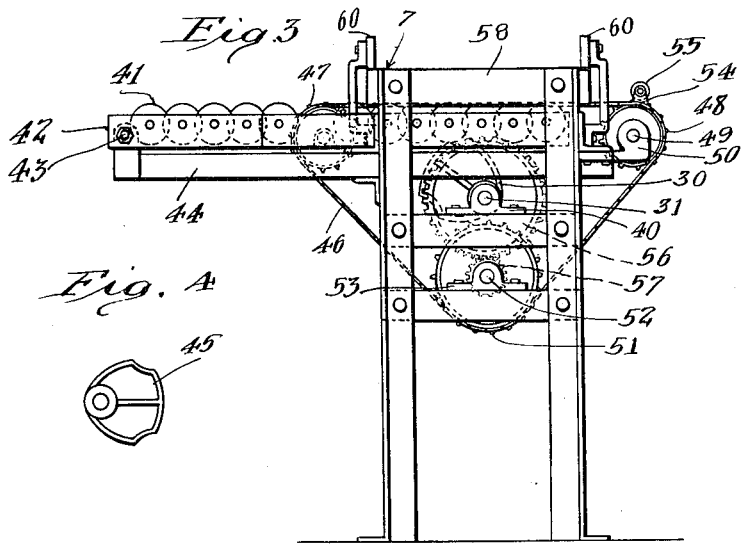
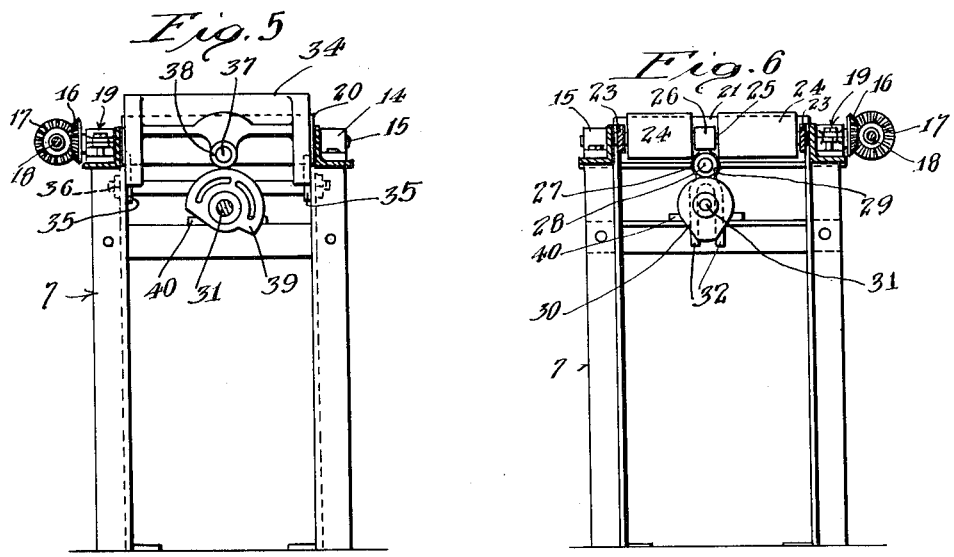
Inventor
Fred Stebler
By Lyon & Lyon
attys Patented July 10, 1923.

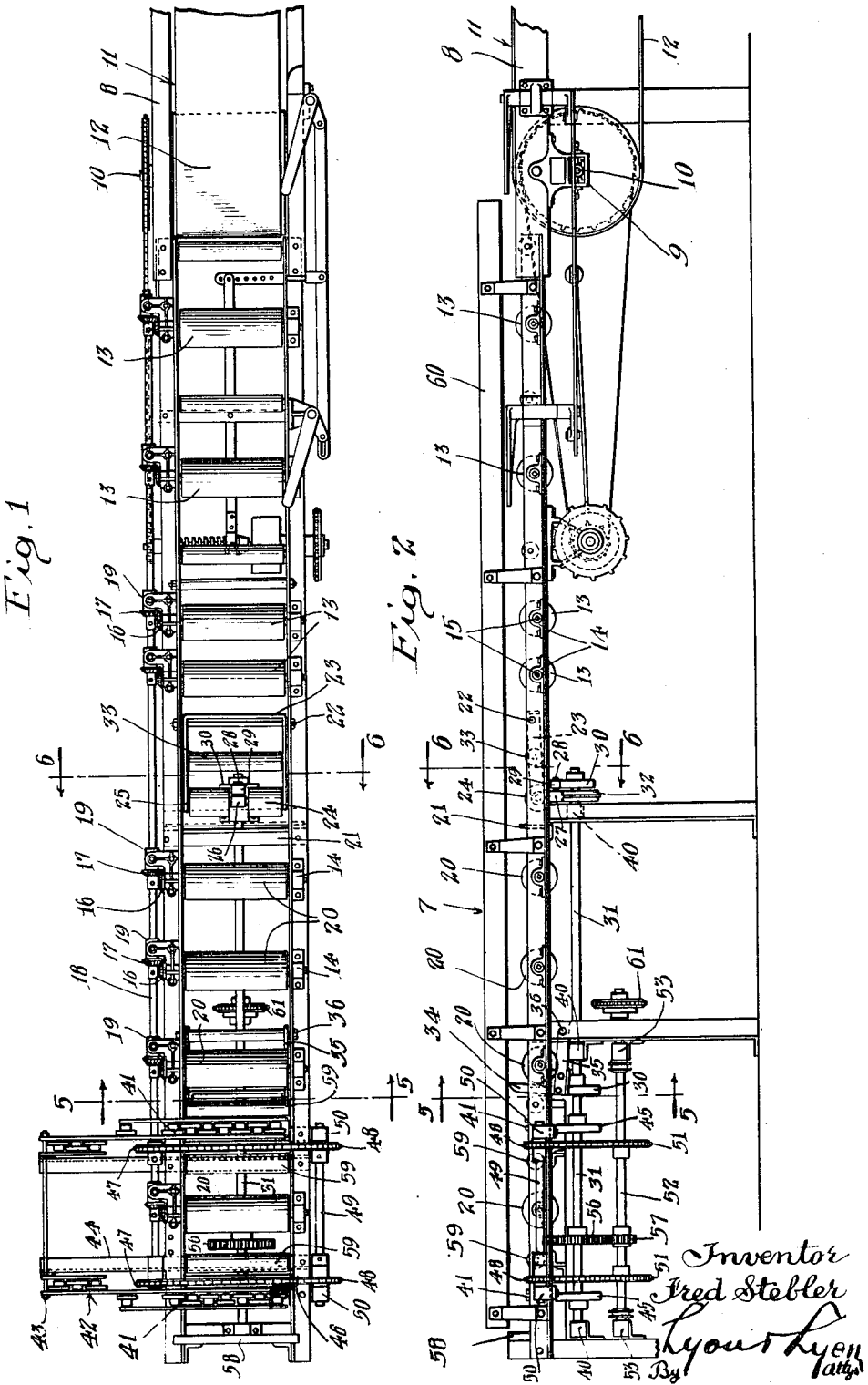
July 10, 1923.
F. STEBLER
BOX ELEVATOR FEEDER
Filed Oct. 31, 1921
1,461,465
2 Sheets-Sheet 1

1,461,465

UNITED STATES PATENT OFFICE.

FRED STEBLER, OF RIVERSIDE, CALIFORNIA, ASSIGNOR TO STEBLER-PARKER CO., OF RIVERSIDE, CALIFORNIA, A CORPORATION OF CALIFORNIA.

BOX-ELEVATOR FEEDER.

Application filed October 31, 1921. Serial No. 511,641.

*To all whom it may concern:*

Be it known that I, FRED. STEBLER, a citizen of the United States, residing at Riverside, in the county of Riverside and State of California, have invented a new and useful Box-Elevator Feeder, of which the following is a specification.

This invention relates to an apparatus for feeding boxes or packages to an elevator or other box-handling apparatus.

An object of the invention is to make provision for moving the boxes in an L-shaped path so as to transport the boxes, for example, from position along a wall to a position in front of an elevator also positioned adjacent the wall, and into the elevator from the front thereof. This feeder may be used to advantage with an elevator of the type disclosed in the copending application of George T. Stamm and myself for patent, Serial No. 291,243, filed April 19th, 1919.

The accompanying drawings illustrate the invention.

Fig. 1 is a plan view of a feeder embodying the invention.

Fig. 2 is a front elevation of Fig. 1.

Fig. 3 is an end elevation from the left of Figs. 1 and 2.

Fig. 4 is a side elevation of one of the carriage-raising cams.

Figs. 5 and 6 are sectional elevations on lines indicated by 5—5 and 6—6, respectively, Figs. 1 and 2.

There is provided a suitable frame indicated in general by the character 7. This frame is shown in Figs. 1 and 2 alined and connected with a frame 8 carrying bearings 9 for the shaft 10 of a box-conveyor indicated in general at 11. This conveyor 11 is not a part of the present invention, but is illustrated to make clear the manner in which the boxes are brought to the feeder. The belt 12 of the conveyor 11 carries the boxes to and pushes them onto a series of rollers 13 of said conveyor. The conveyor 11, of course, may be of any suitable construction, and that illustrated is similar to the conveyor shown and described in my copending application, Serial No. 370,077, filed March 31, 1920, in which the belt is caused to automatically stop when the conveyor is full of boxes.

Mounted on the opposite sides of the frame 7 are bearings 14 in which are journaled shafts 15, each provided with a bevel gear 16. The bevel gears 16 mesh with other bevel gears 17 on a longitudinally extending shaft 18 journaled in bearings 19 connected with the frame 7. The shaft 18 may be, and in this instance is, the same shaft that is used for driving the rollers 13 through suitable gearing as described in the hereinbefore mentioned application. Mounted on the shafts 15 are rollers 20 which are similar to the rollers 13, and their purpose is the same, namely, to cause the boxes supplied by the conveyor belt 12 to move along the frame 7. The rollers 13, 20 are in a common plane.

Secured to the frame 7 and extending transversely thereof is an angle iron 21 which constitutes a stop having its edge slightly below the level of the upper surface of the rollers 13, 20. When the box is moved by the rollers 13 toward the rollers 20 it tips downwardly at its forward end and consequently engages the stop 21 and comes to rest so as to space said box from the box which is immediately preceding it through the machine.

Means are provided to raise the box so that it my ride over the stop 21, and such means are constructed as follows:

Pivoted at 22 to the frame 7 is a U-shaped arm 23, and mounted at the front end of said arm is a roller or rollers 24 on a shaft 25, which is journaled in the opposite sides of said arm. The shaft 25 passes through a collar 26 provided with a downwardly projecting arm 27 from which projects a stud 28. The stud 28 is provided with a follower 29 in the form of a roller which bears upon the peripheral face of a cam 30 turned by a shaft 31. The arm 27 terminates at its lower end in a fork 32 which straddles the shaft 31 so as to guide the lower end of the arm in the reciprocative movement thereof produced by rotation of the cam. The frame 23 is provided with another roller 33 substantially midway of the arm.

When the box is moved into position over the rollers 24, 33, rotation of the shaft 31 causes the rollers 24, 33 to be thrust upwardly into engagement with the box to raise the box sufficiently high to clear the stop 21 and said box then moves over the stop onto the rollers 20 and proceeds on its way toward the discharge end of the feeder. The rollers 24, 33 are immediately lowered by further rotation of the shaft 31 and, while said box is moving away from the stop 21, the next succeeding box is caught by said stop and held for a sufficient interval of time to space the boxes from each other. The reason for this spacing will appear hereinafter.

Before the box reaches the discharge end of the feeder, it comes into contact with a second stop 34 extending transversely of the frame and mounted to move up and down in said frame. The opposite ends of the stop 34 are pivotally connected by arms 35 and pivots 36 to the frame 7. Projecting from the stop 34 is a stud 37 on which is journaled a roller 38, which is substantially midway of the length of the stop 34. The roller 38 is engaged by a cam 39 mounted on the shaft 31, and said shaft turns in bearings 40 secured to the frame 7. The relative arrangement of the cams 30, 39 on the shaft 31 is such that when the roller 24 is raised the stop 34 is lowered, and when the stop 34 is raised said roller is lowered.

It will now appear that the space between two adjacent boxes produced by action of the stop 21 permits the stop 34 to be thrust upward into said space, so as not to interfere with the box in front of the stop 34 and so as to catch the forward lower edge of the box just behind the stop 34. As soon as the forward box is released by downward movement of the stop 34, it proceeds toward the discharge end of the feeder and in doing so it passes into position above two series of idler rollers 41 mounted at opposite sides of a carriage 42, which extends transversely of the frame 7. Likewise the axes of the rollers 41 are at right angles to the axes of the rollers 20. At the time that the box moves into position over the rollers 41, the carriage 42 carrying said rollers is in a position to hold the rollers 41 at a lower level than the rollers 20 so that the rollers 41 will not interfere with the movement of the box into position thereover.

The carriage 42 is movably mounted, being pivotally connected at 43 to the outer end of a bracket 44 projecting from one side of the frame 7. In order to raise and lower the free end of the carriage 42, one or more rollers 41 at both sides of the carriage are engaged by cams 45 mounted on and turned by the shaft 31. Thus rotation of the cams 45 causes the carriage 42 to swing up and down about its pivot 43. The cams 45 are so timed relative to the movement of the stop 34 that elevation of the carriage 42 occurs subsequent to the lowering of the stop 34, the interval of time between the downward motion of the stop 34 and the upward motion of the carriage being just sufficient to permit the box to ride from position behind the stop 34 into position in front of said stop. When the box is in position over the rollers 41, it is also over a pair of endless chains 46 which run over sprockets 47 on the shaft 18 and over idler sprockets 48 mounted on a shaft 49 journaled in bearings 50 secured to one side of the frame 7. The chains 46 also run beneath and are operated by sprockets 51 mounted on a shaft 52 which is journaled in bearings 53 mounted on the frame 7. The chains 46 run in inverted triangular paths with the bases of the triangles in a horizontal plane a trifle below the level of the tops of the rollers 41.

The chains 46 carry box engaging means comprising, in this instance, lugs 54 and rollers 55 journaled on said lugs. The timing of the rollers 55 relative to the cams 45 is such that as soon as the cams 45 have operated to effect raising of the box out of engagement with the rollers 20, the rollers 55 will be in position to engage the box so as to push the box over the idler rollers 41 toward the outer projecting end of the carriage 42. From this carriage 42 the box is picked up by the flights of the elevator not shown, with which the feeder may be employed. An elevator with which this feeder may be used to advantage is disclosed in the hereinbefore mentioned copending application, Serial No. 291,243, filed April 19th, 1919.

The shaft 31 is driven by a spur-gear 56 in mesh with a spur pinion 57 on the shaft 52 which is driven by a sprocket wheel 61 that receives its rotary motion from any suitable source. From the foregoing it is to be understood that the rollers 20 and their driving mechanism constitute one form of means operating to convey the boxes in one direction and in one position, that the chains 46 with their lugs 54 and their driving mechanism, together with the carriage 42 constitute means operating to receive the boxes and move them in a direction at a right angle to the first direction of movement while maintaining the boxes in the same position relative to the first direction of movement and that the roller 38, cam 39 and the mechanism for operating said cam constitute means to effect relative up and down motion between the first and second means. It is also seen that the first and second means are relatively positioned to both lie beneath the box when the box is at the intersection of said means.

It is advisable to provide a stop 58 extending transversely on the frame 7 in position to prevent the boxes being impelled past a position immediately over the rollers 41 and chains 46. It is also of advantage to employ idler rollers 59 on the frame 7 slightly below the level of the rollers 20 to prevent the boxes tipping to too great a degree when the boxes cross the space between the rollers 20. Thus the impelling rollers 20 will have maximum tractive effort on the boxes since the boxes are free from engagement with the rollers 59 when the boxes rest evenly upon the rollers 20.

Guard rails 60 are provided on opposite sides of the frame 7 above the level of the rollers 13, 20 to prevent the boxes from turning and running off of the rollers.

I claim:

1. In a box feeder, the combination of box-conveying means, means projecting above the box-conveying means to intercept the boxes one at a time when they reach a certain position, and means operating at intervals to raise the box above the projecting means to free the box therefrom.

2. In a box feeder, the combination of box-conveying means, means projecting above the box-conveying means to intercept the boxes one at a time when they reach a certain position, means operating at intervals to raise the box above the projecting means to free the box therefrom, a movably mounted stop, and means to move the stop into the path of movement of a box when said box is free from the projecting means and to move the stop out of said path of movement to release the first box when the next succeeding box is being held by the projecting means.

3. In a box feeder, the combination of box-conveying means, other box-conveying means operating transversely of the first box-conveying means, and means to raise the second box-conveying means at predetermined intervals of time from a position below the level of the first box-conveying means to a position above said first box-conveying means.

4. In a box feeder, the combination of a series of rotatably mounted rollers, means to turn said rollers, other rotatably mounted idler rollers positioned with their axes at right angles to the axes of the first rollers, the tops of the second rollers being normally below the level of the tops of the first rollers, means operating to raise the second rollers to position with their tops above the level of the first rollers, and means operating parallel with the second rollers to engage a box resting on said second rollers.

5. In a box feeder, the combination of box-conveying means, means operating in conjunction with the box-conveying means to space adjacent boxes from each other, a movably mounted stop, means to move the stop to and from the space between said boxes, other box-conveying means operating transversely of the first box-conveying means, and means coordinated with the movement of the stop to raise the second box-conveying means from a position below the level of the first box-conveying means to a position above said first box-conveying means.

6. In a box feeder, the combination of a series of rotatably mounted rollers, means to turn said rollers, a stationary stop mounted in front of one of the rollers, and projecting above the level of said rollers, rotary means adjacent the stop normally below the level of the upper edge of said stop, and means operating at predetermined intervals of time to project said rotary means above the level of the rollers.

7. In a box feeder, the combination of a series of rotatably mounted rollers, means to turn said rollers, a stationary stop mounted in front of one of the rollers and projecting above the level of said rollers, rotary means adjacent the stop normally below the level of the upper edge of said stop, means operating at predetermined intervals of time to project said rotary means above the level of the rollers, a movably mounted stop normally below the level of the top of the rollers rearward of the first stop, and means to project the second stop above the level of the roller tops subsequent to the projection of the rotary means.

8. In a box feeder, the combination of means operating to convey boxes in one direction and in one position on the conveying means, means operating to receive the boxes and move them in a direction at a right angle to the first direction of movement while maintaining the box in the same position relative to the first direction of movement, and means to effect relatively up and down motion between the first and second means, said first and second means being relatively positioned to both lie beneath the box when the box is at the intersection of said means.

Signed at Los Angeles, California, this 25 day of October, 1921.

FRED STEBLER.

Witnesses:
GEORGE H. HILES,
L. BELLE WEAVER.